US006972305B1

(12) United States Patent
Griessmann et al.

(10) Patent No.: US 6,972,305 B1
(45) Date of Patent: Dec. 6, 2005

(54) PIGMENT PREPARATION

(75) Inventors: Carsten Griessmann, Gross-Zimmern (DE); Gerhard Herget, Ober-Ramstadt (DE); Jochen Meyer, Bielefeld (DE); Thomas Rathschlag, Weilburg (DE)

(73) Assignee: Merck Patent GmbH, Darmstadt (DE)

( * ) Notice: Subject to any disclaimer, the term of this patent is extended or adjusted under 35 U.S.C. 154(b) by 120 days.

(21) Appl. No.: 10/018,827

(22) PCT Filed: Jun. 13, 2000

(86) PCT No.: PCT/EP00/05391

§ 371 (c)(1),
(2), (4) Date: Apr. 18, 2002

(87) PCT Pub. No.: WO01/00738

PCT Pub. Date: Jan. 4, 2001

(30) Foreign Application Priority Data

Jun. 25, 1999 (DE) ................ 199 29 378

(51) Int. Cl.$^7$ ............... C09D 5/29; B32B 5/16
(52) U.S. Cl. ............ 523/171; 523/202; 428/363; 428/403; 106/401
(58) Field of Search ............... 523/171, 202; 428/363, 403

(56) References Cited

U.S. PATENT DOCUMENTS

| | | | | |
|---|---|---|---|---|
| 5,596,027 A | * | 1/1997 | Mead et al. | 523/161 |
| 5,830,927 A | * | 11/1998 | Vanderhoff et al. | 522/81 |
| 5,897,698 A | * | 4/1999 | Bellas | 106/416 |

FOREIGN PATENT DOCUMENTS

| | | |
|---|---|---|
| DE | 25 22 986 A | 12/1976 |
| EP | 0 528 602 A | 2/1993 |
| EP | 0 803 552 A | 10/1997 |
| WO | WO 98 38253 A | 9/1998 |

OTHER PUBLICATIONS

M. Dalton et al., "Stabillsierung von Dispersionsn" Farbe & Lack, Bd. 103, Nr. 10, 1997, XP002151087.

* cited by examiner

*Primary Examiner*—Tae H. Yoon
(74) *Attorney, Agent, or Firm*—Millen, White, Zelano & Branigan, P.C.

(57) ABSTRACT

The invention relates to a non-dusting homogeneous pigment preparation notable in that it comprises at least 40% by weight of one or more effect pigments, from 0.5 to 50% by weight of water and/or an organic solvent or solvent mixture and from 0.5 to 59.5% by weight of a styrene-modified polyacrylate resin having an acid number >90 mg KOH/g, and to its use to produce dry preparations.

19 Claims, No Drawings

PIGMENT PREPARATION

The invention relates to a non-dusting homogeneous pigment preparation notable in that it comprises at least 40% by weight of one or more effect pigments, 0.5–50% by weight of water and/or an organic solvent or solvent mixture, and 0.5–59.5% by weight of a styrene-modified polyacrylate resin having an acid number of >90 mg KOH/g based on the pigment. Pigment preparations of this kind are particularly suitable for producing dry preparations, such as granules, for example. The invention further relates to the production of the pigment preparation and the granules and to the use thereof for pigmenting printing inks.

In industrial processes, pigments are often not employed in the form of dry powders, since such powders produce dust, which results in heightened requirements in terms of workplace safety. In many cases, furthermore, when introducing powders into plastics, printing inks, industrial coatings, basecoat systems, etc., agglomeration of the pigment powder is observed. Homogeneous distribution of the pigment in the respective matrix is frequently difficult if not impossible to achieve.

Instead of the pigment powder, non-dusting pigment formulations or dry preparations are used. These are

- free-flowing powders, pearl lustre pigments being coated with polymers, as are described, for example, in DE-C-2603211,
- pigmented free-flowing powders having a low moisture content, as are known, for example, from DE-A-4139993,
- pigmented powders having a relatively high moisture content, which owing to their flowable consistency are frequently referred to as pastes,
- pigment formulations in granule form, in which organic pigments are coated with a resin mixture, as disclosed, for example, in EP 0 897 956 A2, or
- dry preparations, such as pellets, granules as precursors for printing inks, as are known, for example, from EP 0 803 552 A1.

Non-dusting homogeneous pigment preparations and dry preparations prepared from them are an industrial alternative to the dry or moistened powders provided that they meet the following general conditions:

- flowable consistency
- minimal dilatancy
- maximum pigment content

The components of the preparation/paste, or of the dry preparations, should be chosen such that the formulation is harmonized very effectively with the other components of the respective coating system and is readily homogeneously distributed following its introduction.

In addition to good compatibility with the other constituents of the coating system, pigment preparations, and the dry preparations produced from them, are required to result in high stability in the coating systems, i.e., they must not tend towards phase separation, or, where this cannot be entirely prevented owing to the low viscosity, the coating systems must be able to be returned easily to a homogeneous state, i.e., the settled sediment must be easy to reagitate. This requirement is particularly important in the case of platelet-shaped pigments, since owing to their structure such pigments have a tendency to undergo "caking" on phase separation and are difficult to reagitate. Pigments based on platelet-shaped substrates give rise to handling problems insofar as, owing to the size and density of the pigments, they readily settle and may then cake together to form a very firm sediment cake. This cake is generally difficult to reagitate. This is particularly so in connection with the storage of varnishes, paints and printing inks, as well as in connection with their processing.

For this reason, numerous methods, inter alia, have been developed in order to solve the problem of the incorporation and handling of platelet-shaped pigments in coating compositions. Reagitation can be facilitated by adding to the coating compositions additives which alternatively bring about controlled flocculation (house of cards effect), pseudoplastic and/or thixotropic behaviour, or steric and/or electrostatic repulsion of the pigments. However, these additives may have an adverse effect on the quality of the coating. In particular, the brilliance in the case of effect pigments, and the uniformity of the coating, may be impaired.

In addition, homogeneous, stable distribution of the redispersants in the pearl lustre pigment powder is difficult to achieve, and/or the redispersant loses some of its activity in the course of mixing.

The effect pigment formulations developed to date for use in coating systems, with a pigment content >30% by weight, frequently do not go far enough towards meeting the requirements described above, especially since they have a tendency towards agglomeration and shear thickening.

The object of the present invention was therefore to provide pigment preparations, especially those in the form of formulations or pastes and dry preparations, which simultaneously can be used very effectively in solventborne and solvent-free coating systems, possess high stability, are easy to redisperse, and at the same time feature a high level of compatibility with the other components of the coating system. Furthermore, the pigment preparation of the invention ought also to be highly suitable for producing dry preparations in the form, for example, of pellets, granules, etc.

It has surprisingly been found that this object can be achieved by the provision of the pigment preparation of the invention.

The invention therefore provides a non-dusting homogeneous pigment preparation which comprises

| | |
|---|---|
| ≥40% by weight | of one or more effect pigments, |
| 0.5–59.5% by weight | of a styrene-modified polyacrylate resin having an acid number >90 mg KOH/g, |
| 0.5–50% by weight | of water and/or an organic solvent or solvent mixture, |
| 0–10% by weight | of neutralizing agent(s), and |
| 0–10% by weight | of modifying agent. |

Depending on its moisture content, the preparation of the invention is a flowable paste or a moistened, free-flowing powder. Both are highly suitable for producing dry preparations, e.g. granules, pellets, briquettes. The dry preparations produced from the pigment formulation of the invention are likewise provided by the invention.

EP 0 803 552 A1 describes, in a very general form, free-flowing granules comprising a pearl lustre pigment and also a binder, such as a polyacrylate, for example. In contrast to granules with conventional polyacrylate resins, the dry preparations/granules of the invention comprising a styrene-modified polyacrylate and an effect pigment, such as a pearl lustre pigment, for example, are distinguished by a high glass transition temperature. This fact ensures a blocking-resistant formulation of the paints, varnishes, printing inks and overprint varnishes produced therefrom. Furthermore, the granules of the invention are distinguished by excellent compatibility with the customary resins and additives.

Moreover, the products of the invention are non-dusting, readily free-flowing, can be incorporated rapidly into commercially available binder systems, and are compatible therein. In particular, the products are compatible with aqueous and solventborne systems and in some cases compatible in solvent-free printing ink and coating systems as well. The paints and varnishes produced from the dry preparation, e.g. granules, are suitable for gravure, flexographic and screenprinting, offset overprint varnishes, overprint varnishes (OPVs), and also the various coating systems from the industrial coatings and automotive sector. They are also suitable for colouring plastics.

The pigment preparation of the invention contains preferably 40–98% by weight of effect pigments, especially 45–95% by weight, based on the preparation. Very particular preference is given to pigment preparations having an effect pigment content of more than 50% by weight. The percentages by weight are based in each case on the moist, i.e. undried, pigment preparation.

Effect pigments used are pigments based on platelet-shaped, transparent or semi-transparent substrates comprising, for example, sheet silicates, such as mica, synthetic mica, platelet-shaped iron oxide, $SiO_2$ flakes, $TiO_2$ flakes, graphite flakes, $Fe_2O_3$ flakes, $Al_2O_3$ flakes, glass flakes, holographic pigments, talc, sericite, kaolin, or other silicatic materials coated with rare earth metal sulfides such as, e.g., $Ce_2S_3$, coloured or colourless metal oxides, e.g. $TiO_2$, titanium suboxides, titanium oxynitrides, $Fe_2O_3$, $Fe_3O_4$, $SnO_2$, $Cr_2O_3$, ZnO, CuO, NiO, and other metal oxides, alone or in a mixture in one uniform layer or in successive layers (multilayer pigments). The multilayer pigments are known, for example, from the German unexamined laid-open specifications DE 197 46 067, DE 197 07 805, DE 19 07 806 and DE 196 38 708. Pearl lustre pigments based on mica flakes are known, for example, from the German patents and patent applications 14 67 468, 19 59 998, 20 09 566, 22 14 454, 22 15 191, 22 44 298, 23 13 331, 25 22 572, 31 37 808, 31 37 809, 31 51 343, 31 51 354, 31 51 355, 32 11 602, 32 35 017 and P 38 42 330 and are obtainable commercially, e.g. under the brand names Minatec® and Iriodin® from Merck KGaA, Darmstadt, FRG. Particularly preferred pigment preparations comprise $TiO_2$/mica, $Fe_2O_3$ mica and/or $TiO_2$/$Fe_2O_3$ mica pigments. The $SiO_2$ flakes can be coated, for example, as described in WO 93/08237 (wet-chemical coating) or DE-A 196 14 637 (CVD process). $Al_2O_3$ flakes are known, for example, from EP 0 763 573 A1. Platelet-shaped substrates coated with one or more rare earth metal sulfides are disclosed, for example, in DE-A 198 10 317.

Also suitable are metal effect pigments, especially aluminium flakes modified for aqueous systems, as sold by Eckart under the brand name Rotovario Aqua® or Stapa Hydroxal, and also Variocrom® and Paliocrom® pigments from BASF, including in particular those from the laid-open specifications EP 0 681 009, EP 0 632 110, EP 0 634 458, and also LCP (liquid crystal polymer) pigments. Likewise suitable, furthermore, are all platelet-shaped pigments known to the person skilled in the art which have metal layers. Pigments of this kind are sold by the companies Flex, BASF, Eckart and Schlenk.

The pigment preparations of the invention may comprise one or more effect pigments. In many cases it is possible by using at least two different effect pigments to obtain special colour effects and lustre effects. Preferred pigment preparations comprise one or more effect pigments based on mica and/or $SiO_2$ flakes. Blends with up to 10% by weight of organic and inorganic pigments, based on the pigment preparation, are also possible.

In particular, the addition of one or more dyes and/or organic pigments in dispersed form leads to special colour effects. It is also possible to add substances and particles (tracers) which enable the product to be identified (product protection).

As a mandatory component, the pigment preparation of the invention comprises a styrene-modified polyacrylate resin having an acid number >90 mg KOH/g in amounts of from 0.5 to 59.5% by weight, preferably from 5 to 40% by weight, in particular from 10 to 30% by weight. Particular preference is given to styrene-modified polyacrylate resins having an acid number of >100, in particular of >150.

The styrene-modified polyacrylates used have an average molecular weight of from 500 to 200,000, preferably from 1000 to 100,000, in particular from 1000 to 50,000. In the case of otherwise identical properties, the polymers having a low molecular weight are preferred, since they generally have a smaller thickening effect in the coating systems.

The styrene-modified polyacrylates are prepared by free-radical addition polymerization, especially copolymerization or terpolymerization, in the course of which it is possible to incorporate saturated and unsaturated alcohols and also other functionalizations in broad mass proportions. In particular, polyethylene and polypropylene units, or mixtures of alkylene oxides, can also be incorporated into the polymer framework, as can alkylene oxide esters, alkylene oxide amines, alkylene oxide ethers, and free carboxyl groups. This incorporation is in particular of great advantage for the compatibility of the products of the invention in aqueous systems. The styrene-modified polyacrylates thus prepared are notable for their light stability (yellowing resistance), their resistance to oxygen (storage stability), their resistance to self-ignition, and by their low static charging.

α-Methylstyrene-modified polyacrylate resins are particularly suitable. Preference is given, in accordance with the invention, to the use of resins having a glass transition temperature which is above room temperature. This rules out blocking and deficient free-flow capabilities of the dry preparation. For instance, the polyacrylate resins used have a glass transition temperature of preferably 50–140° C., in particular 50–130° C. The softening point of the resins used is preferably between 90–150° C., in particular between 100–120° C.

The styrene-modified resins are also obtainable commercially, for example, under the brand names Joncryl® (Johnson Polymers), Carboset® (BF Goodrich) or Morton® (Morton International).

It is further advantageous if the pigment preparation of the invention contains from 0 to 10% by weight, preferably from 0.05 to 5% by weight, in particular from 0.01 to 3% by weight, of a modifier. The modifier used is in particular a polyalkylene oxide or derivative thereof, in order to increase the strength, compatibility and dissolution rate of the dry preparations. Further suitable modifiers are reagitability-enhancing resins such as rosins, maleate resins, urethane resins, nitrocellulose and all known cellulose derivatives, polyesters, PVC, sulfo polyesters, polyethylene glycol esters and ethers, emulsifiers and surfactants in amounts of from 0.1 to 10% by weight, preferably from 0.05 to 5% by weight, in particular from 0.01 to 3% by weight, based on the preparation.

In particular, it is also possible to add substances which accelerate or assist the breakdown and dissolution of the pigment granules, examples being bulky spherical particles, such as hollow beads, hemispherical beads, swellable substances with a strong swelling power, substances which undergo controlled breakdown and in doing so evolve gases, and/or substances having very high solubility.

As a further component, the pigment preparation of the invention or dry preparations produced from it preferably include one or more neutralizing agents. Particularly suitable agents are the bases common in the coatings sector, such as urea, urea derivatives, ammonia, amino alcohols, alkali metal hydroxides, such as KOH or NaOH, and amines, for example; in the case of preparations for aqueous applications, the bases are preferably nonvolatile organic amines of low molecular mass or amines of this kind whose volatility at 100° C. is low.

The acid number of the polyacrylate in conjunction with the neutralizing agent gives the resins water solubility. Water solubility in accordance with the present invention is on the one hand important in connection with the preparation process, in order to permit an aqueous route, while on the other hand the water solubility is a prerequisite for use in aqueous and waterborne printing ink systems (compatibility).

In general, the pigment preparation of the invention contains from 0 to 10% by weight of a neutralizing agent, preferably from 1 to 7% by weight, in particular from 1 to 5% by weight, based on the pigment preparation.

If necessary, the addition of a redispersing aid in the form of bulky particles, such as fibres or spherical particles, for example, prevents the effect pigments treated in accordance with the process of the invention from lying on top of one another to a notable extent as a result of steric repulsion and so exerting strong adhesion. The result of this is that 1. the preparations of the invention are more stable, and
2. owing to the introduction of the redispersing aid into the paint or varnish system by way of the pigment preparation, the effect pigments settle more slowly, in some cases very much more slowly, in paint and varnish systems;

in all cases, however, the sediment is less hard, and no problems occur when the sediment is reagitated.

The redispersant is preferably used in amounts of from 0 to 5% by weight, in particular from 0.05 to 3% by weight, based on the pigment preparation. All organic and inorganic fibres known to the person skilled in the art and having a fibre length of 0.1-20 $\mu$m can be used. Particularly suitable particles are all synthetic fibres, made for example from polyethylene, polyacrylates, polypropylene, polyamides, cellulose fibres, inorganic fibres, preferably silicon compounds, glass fibres, and also, in particular, the condensation products of modified isocyanates and mono- and diamines.

These condensation products, which are diurea derivatives and aminoureas having urethane groups, are known as thixotropic agents and, together with a binder, are added to paints and varnishes in order to improve the running properties and the brushability.

Redispersing aids which can be used are all those diurea derivatives and urethane compounds known to the person skilled in the art, as are described, for example, in EP 0 198 519, DE 18 05 693.4, and in Organic Coatings: Science and Technology, A. Heenriga, P. J. G. von Hemsbergen, pp. 201–222, New York 1983.

Suitable spherical materials are, in particular, hollow glass, wax or polymer beads made from vinyl resins, nylon, silicone, epoxy resins, olefin resins and polystyrenes, and from inorganic materials, such as $TiO_2$, $SiO_2$ or $ZrO_2$, for example. Preference is given to the use of hollow beads, and also solid beads, having a particle size of from 0.05 to 150 $\mu$m. With particular preference, hollow glass, wax or polymer beads are used in the pigment preparation of the invention.

Spherical particles based on $SiO_2$ in a particle range of 3–10 $\mu$m are known, for example, as materials for high-performance liquid chromatography and are sold, for example, as LiChrospher® by Merck KGaA, Darmstadt, FRG. Such materials are preferably used in monodisperse form; that is, with a substantially uniform particle size. Monodisperse spherical particles of this type based on $SiO_2$, $TiO_2$ and $ZrO_2$ are known. Monodisperse $SiO_2$, for example, can be prepared in accordance with DE 36 16 133. Hollow glass beads are sold, for example, under the trade name Q-CEL by PQ Corporation, USA, or Scotchlite by 3M, Frankfurt, FRG.

In addition, the pigment preparation of the invention may comprise surface-active substances, such as alkylsilanes, for example, which may also contain a further functional group, or unsaturated or saturated fatty acids or fluorosurfactants. Particular preference is given to the use of silane compounds of the formula $(C_nH_{2n+1})$ $Si(OC_mH_{2m+1})_3$, where n is 1–30 and m is 1–10, as surface-active substances. Examples of suitable silane compounds are n-hexyldecyltriethoxysilane and n-octyldecyltriethoxysilane (Si 116 and Si 118, respectively, from Degussa AG, Frankfurt, FRG), and also the corresponding fluoroalkylsilanes.

In addition to the silane, the pigment preparation preferably further comprises a surfactant or a fatty acid. The surface-active reagent may also comprise a mixture of silane, fatty acids and/or surfactants. The pigment preparations can contain from 0.1 to 5% by weight, preferably from 0.2 to 3% by weight and, in particular, from 0.5 to 2% by weight of surface-active substances, based on the preparation.

Further surface-active substances which may be used are the saturated and unsaturated fatty acids, such as capronic acid, caprylic acid, capric acid, lauric acid, myristic acid, palmitic acid, stearic acid, oleic acid, linoleic acid, and also fatty acid mixtures, for example.

The pigment preparation of the invention contains from 0.5 to 50% by weight of water and/or an organic solvent or solvent mixture, preferably from 1 to 45% by weight, in particular from 1 to 40% by weight, based on the preparation.

The solvent component in the pigment preparation of the invention must be properly matched to the resin having an acid number >90 mg KOH/g. For the preparation, water and all organic solvents can be used depending on the polyacrylate resin employed. Examples of suitable solvents are aromatic solvents such as toluenes, benzines, xylenes, hydrocarbons and also esters, cyclohexane, furans, dioxanes, chlorinated hydrocarbons, long-chain amines, vegetable oils, monohydric aliphatic alcohols, such as those having 2 to 4 carbon atoms, e.g. ethanol, butanol or isopropanol, or ketones, e.g. acetone or methyl ethyl ketone, or glycol ethers, such as propylene glycol monomethyl ether, propylene glycol monoethyl ether, or diols, such as ethylene glycol and propylene glycol or polyether diols, aliphatic triols and tetraols having 2 to 6 carbon atoms, such as trimethylolethane, trimethylolpropane, glycerol, 1,2,4-butanetriol, 1,2,6-hexanetriol and pentaerythritol, and all other solvents from other classes of compound, or mixtures of the abovementioned solvents. It is preferred to use those solvents that are listed in Karsten, Lackrohstofftabellen, $9^{th}$ edition 1992.

The pigment preparation of the invention is produced in a simple manner by adding the polyacrylate resin, with or without water and/or an organic solvent or solvent mixture, a modifier and, if desired, further additives, simultaneously or in succession to the effect pigment or effect pigment mixture and subjecting the resulting mixture to gentle homogenization in a mixing apparatus.

Preferably, the pigment is introduced as initial charge and first pasted up, with stirring, with the water and/or the organic solvent or solvent mixture comprising the polyacrylate resin, and possibly even at this stage the modifier; subsequently, if desired, a further solution consisting of water and/or solvent and additives is added.

During or after its production, further customary additives may be added to the pigment preparation of the invention, examples being defoamers, wetting agents, anti-settling agents, levelling agents, siccatives and thixotropic agents. These are auxiliaries which are customary in the coatings industry and which may be present in the pigment preparation of the invention in an amount of from 0 to 10% by weight. Mention is made here in particular of succinate derivatives, examples being those as sold by Henkel under the brand name Hydropalat 875.

The resultant moist pigment preparation of the invention is a homogeneous powder, or readily flowable pastes, having a relatively high effect pigment content. Because of the particularly high level of compatibility of the styrene-modified polyacrylate resin, the pigment preparation of the invention is likewise thoroughly compatible with commercially customary systems. Further features which distinguish the preparation are its freedom from dust, ready dispersibility and ready redispersibility, and it is therefore markedly superior to conventional pigment preparations.

In order to produce dry preparations, the pigment preparation of the invention is extruded or, by other methods known to the person skilled in the art, compressed into a compact particulate form by means, for example, of tabletting, briquetting, pelletizing, granulating, spray-granulating, fluidized-bed granulating, or extrusion, and may then be dried. The drying procedure generally takes place at temperatures from 20° C. to 150° C., preferably at from 60 to 120° C., and can if desired be carried out under reduced pressure. The dry preparations, such as granules, for example, have a residual moisture content of not more than 5% by weight, preferably <3% by weight. The granules have pigment contents of >70% by weight, preferably of >80% by weight, based on the granules. Finally, the dry preparation is, if desired, classified. The dried granules obtained in this way have positive properties which are further increased relative to the water- and/or solvent-containing preparations: the absence of liquid components increases the compatibility. Dry granules in particular also, surprisingly, showed no disadvantages in terms of wetting. On the contrary, when added to an aqueous binder or to a binder based on polar solvents (ethanol, ethyl acetate, MEK, etc.) the granule breaks down rapidly and there is immediate and complete wetting. Further advantages of a dry formulation are the improved storage stability, the easier transportation, and the improved product safety for the customer. Granules, in bead form for example, are very readily free-flowing, easy to meter, and combine all of these properties with the total absence of dust. The volume of these granules is reduced to about ⅓ of the volume of pearl lustre pigment powders. The particle sizes of the dry preparations are in the range of 0.1 to 150 mm, preferably 0.1–20 mm, in particular 0.1–2 mm.

In addition to their ready compatibility with the coating systems and the synergy effects with the other components in the pigment preparation or in the dry preparation, the high acid number of the styrene-modified polyacrylate enables the resins to be converted, together with neutralizing agents, into a water-soluble form. The production of the dry preparations, such as granules, for example, can therefore be completed by an aqueous route, which offers considerably greater production safety as compared with the use of solvents.

The integration of a redispersing aid ensures that even in the finished varnish and paint systems the pigment preparations of the invention are easy to stir and require no further improvement by the end formulator.

The improved deagglomeration of the dry preparations when incorporated into a binder, such as into a printing ink, is evident even with small amounts of spherical particles in the pigment preparation. For instance, even when using granules having a spherical particle content of 0.5% by weight based on the dry preparation, the dissolution rate is markedly increased and the stability of the printing ink is attained more rapidly (viscosity/hue).

The dry preparations are non-dusting, readily free-flowing, can be incorporated rapidly into commercially available binder systems, and are compatible therein. In particular, the products are compatible not only with aqueous and solvent-borne but also with solvent-free printing inks and coating systems.

As a paste or as a dry preparation, the preparation of the invention can be used for diverse applications. It is preferably used in coating systems from the sectors of printing, especially overprint varnishing, offset overprint varnishing, and gravure, flexographic and screenprinting. With particular preference, the preparation or the dry preparation produced from it is applied as a precursor for coating compositions on any desired substrate materials, examples being metals such as iron, steel, aluminium, copper, bronze; plastic; brass and also metal foils, and also glass, ceramic and concrete, and also on wood, e.g. furniture, clay, textile, paper, packaging materials, e.g. plastic containers, films or boards, or on other materials for decorative and/or protective purposes.

The invention therefore also provides for the use of the pigment preparation in formulations such as paints, varnishes, printing inks and plastics, and also automotive finishes, powder coating materials and coating compositions in general.

The examples which follow are intended to illustrate the invention without, however, restricting it.

EXAMPLE 1

679 g of Joncryl® HPD 671 resin solution (26% strength solution of a styrene-modified polyacrylate resin consisting of 80 g of AMP 75, 176.5 g of Joncryl® HPD 671 having an acid number of 214 and a molecular weight of 17250, and 922.5 g of DI water) are mixed homogeneously in a R02 mixer from Eirich with 1000 g of Iriodin® 123 ($TiO_2$ mica pigment with a particle size of 5–20 μm from Merck KGaA). The moistened mixture is granulated on a TR01 granulating plate from Eirich. The moist, granulated mixture is dried at 80° C. and 100 mbar. The dried granules are passed first over a sieve having a mesh size of 2 mm and then over a sieve having a mesh size of 200 μm.

The product is abrasion resistant, dimensionally stable, and compatible with the common aqueous binder Senolith high-gloss varnish 350081 (offset overprint varnish based on a styrene-acrylate dispersion, containing a sodium salt of sulfosuccinic acid as modifier) from Weilburger Lackfabrik.

EXAMPLE 2

A solution is prepared from 69.8 g of Joncryl® 682 granulating resin (styrene-modified polyacrylate resin having a molecular weight of 1800 from Johnson Polymers), 287.4 g of DI water, 5.4 g of 25% strength ammonia solution, 37.0 g of AMP-75 (2-amino-2-methyl-1-propanol), and 14.0 g of polyethylene glycol 2000 (modifier) and this solution is mixed homogeneously in a 4-paddle mixer with 586.4 g of Iriodin® 100 ($TiO_2$ mica pigment of particle size 10–60 µm from Merck KGaA).

The preparation produced in this way is granulated on a TR01 granulating plate from Eirich. The granules are dried at 100° C. In order to separate the coarse fraction and fine fraction from the desired fraction, the dry granules are first passed over a coarse sieve (upper particle limit 1.6 mm) and then the dust and the fine fraction is separated off over a fine sieve (particle size less than 0.4 mm). The granules prepared in this way are abrasion resistant, dimensionally stable, and readily compatible with the aqueous binder Senolith high-gloss varnish 350081 (offset overprint varnish based on a styrene-acrylate dispersion, containing a sodium salt of sulfosuccinic acid as modifier) from Weilburger Lackfabrik.

EXAMPLE 3

A solution is prepared from 69.8 g of Joncryl® 682 granulating resin (styrene-modified polyacrylate resin having a molecular weight of 1800 from Johnson Polymers), 287.4 g of DI water, 5.4 g of 25% strength ammonia solution, 37.0 g of AMP-75 (2-amino-2-methyl-1-propanol), and 14.0 g of Hydropalat 875 (Na salt of sulfosuccinic acid, from Henkel) and this solution is mixed homogeneously in a 4-paddle mixer with 586.4 g of Iriodine® 100 ($TiO_2$ mica pigment of particle size 10–60 µm from Merck KGaA).

The preparation produced in this way is granulated on a TR01 granulating plate from Eirich. The granules are dried at 100° C.

In order to separate the coarse fraction and fine fraction from the desired fraction, the dry granules are first passed over a coarse sieve (upper particle limit 1.6 mm) and then the dust and the fine fraction is separated off over a fine sieve (particle size less than 0.4 mm).

The granules prepared in this way are abrasion resistant, dimensionally stable, and readily compatible with Senolith high-gloss varnish 350081 (offset overprint varnish based on a styrene-acrylate dispersion, containing a sodium salt of sulfosuccinic acid as modifier) from Weilburger Lackfabrik.

EXAMPLE 4

A solution is prepared from 69.8 g of Joncryl® 682 granulating resin (styrene-modified polyacrylate resin having a molecular weight of 1800 from Johnson Polymers), 287.4 g of DI water, 5.4 g of 25% strength ammonia solution, 37.0 g of AMP-75 (2-amino-2-methyl-1-propanol), and 14.0 g of polyethylene glycol 2000 (modifier) and this solution is mixed homogeneously in a 4-paddle mixer with 586.4 g of $Fe_2O_3$-coated $SiO_2$ flakes of particle size 5–40 µm (from Merck KGaA).

The preparation produced in this way is granulated on a TR01 granulating plate from Eirich. The granules are dried at 100° C.

In order to separate the coarse fraction and fine fraction from the desired fraction, the dry granules are first passed over a coarse sieve (upper particle limit 1.6 mm) and then the dust and the fine fraction is separated off over a fine sieve (particle size less than 0.4 mm).

The granules prepared in this way are abrasion resistant, dimensionally stable, and readily compatible with the common solvent-free aqueous binder/coating systems, such as, for example, Senolith high-gloss varnish 350081 from Weilburger Lackfabrik from the printing sector.

EXAMPLE 5

413.6 g of a 16.9% strength Joncryl® 682 solution (solution consisting of 287.4 g of water, 14 g of polyethylene glycol 2000, 42.2 g of 2-amino-2-methylpropanol (75% strength) and 69.8 g of Joncryle® 682) are mixed homogeneously in a R02 mixer from Eirich with 586.4 g of Iriodin® 100 ($TiO_2$ mica pigment with a particle size of 10–60 µm from Merck KGaA). The moistened mixture is granulated on a TR01 granulating plate from Eirich. The moist, granulated mixture is dried at 80° C. and 100 mbar. The dried granules are passed first over a sieve with a mesh size of 2 mm and then over a sieve with a mesh size of 200 µm. The product is abrasion resistant and dimensionally stable and readily compatible with the common aqueous binder/varnish systems, such as, for example, Senolith high-gloss varnish 350081 from Weilburger Lackfabrik from the printing sector.

COMPARATIVE EXAMPLE (EP 0 803 552 A1)

Granules comprising pearl lustre pigment (Iriodin® 123) and polyacrylate (not styrene-modified)

643 g of Neocryl B817 (17.5% strength neutralized solution in AMP 75 of a MMA/EA copolymer in water, having an acid number of 59, a $T_g$ of 65° C. and an average molecular weight of 20,000, from Zeneca Resins, Waalwijk, Netherlands) and 1000 g of Iriodin® 123 ($TiO_2$ mica pigment of particle size 5–20 µm from Merck KGaA) are mixed homogeneously in a mixer. The moistened mixture is granulated on a TR01 granulating plate from Eirich. The moist, granulated mixture is dried at 80° C. and 100 mbar. The dried granules are passed first over a sieve with a mesh size of 2 mm and then over a sieve with a mesh size of 200 µm.

The product is stable to abrasion and dimensionally stable. In comparison to Examples 1-6, it disperses much more slowly in the test binder Senolith high-gloss varnish 350081 from Weilburger Lackfabrik and in contrast to styrene-modified polyacrylate resin having acid numbers >90 it shows only retarded dissolution in conventional and aqueous binders and overprint varnishes. At the same time, increased tendency to foam was noted when the Neocryl B 817 solid resin was being hydrolysed.

What is claimed is:

1. A non-dusting homogeneous pigment composition, which comprises:
   ≧50% by weight of one or more effect pigments,
   0.5–59.5% by weight of a styrene-modified polyacrylate having an acid number >90 mg KOH/g,
   0.5–50% by weight of water and/or an organic solvent or solvent mixture,
   0–10% by weight of a neutralizing agent, and
   0–10% by weight of a modifying agent.

2. A non-dusting homogeneous pigment composition according to claim 1, wherein the effect pigment is a pearl luster pigment and/or an $SiO_2$ flake coated with one or more metal oxides.

3. A non-dusting homogeneous pigment composition according to claim 2, wherein the effect pigment is a pearl luster pigment of $TiO_2$ and/or $Fe_2O_3$ coated on mica.

4. A non-dusting homogeneous pigment composition according to claim 2, wherein the effect pigment is a pigment of $SiO_2$ flake coated with $TiO_2$ and/or $Fe_2O_3$.

5. A non-dusting homogeneous pigment composition according to claim 1, wherein the styrene-modified polyacrylate is an α-methylstyrene-modified polyacrylate.

6. A non-dusting homogeneous pigment composition according to claim 2, wherein the styrene-modified polyacrylate is an α-methylstyrene-modified polyacrylate.

7. A non-dusting homogeneous pigment composition according to claim 3, wherein the styrene-modified polyacrylate is an α-methylstyrene-modified polyacrylate.

8. A non-dusting homogeneous pigment composition according to claim 4, wherein the styrene-modified polyacrylate is an α-methylstyrene-modified polyacrylate.

9. A non-dusting homogeneous pigment composition according to claim 1, which further comprises at least one: defoamer, surface-active substance, wetting agent, anti-settling agent, levelling agent, siccative or thixotropic agent.

10. A dry material produced by tabletting, briquetting, pelletizing, fluidized-bed granulating, granulating, spray-granulating or extruding a pigment composition, optionally in the presence of a solvent, and, optionally, freeing the dry material from the solvent, wherein the pigment composition is a non-dusting homogeneous pigment composition comprising:
  ≧40% by weight of one or more effect pigments,
  0.5–59.5% by weight of a styrene-modified polyacrylate having an acid number >90 mg KOH/g,
  0.5–50% by weight of water and/or an organic solvent or solvent mixture,
  0–10% by weight of a neutralizing agent, and
  0–10% by weight of a modifying agent.

11. A dry material according to claim 10, wherein the effect pigment is a pearl luster pigment and/or an $SiO_2$ flake coated with one or more metal oxides.

12. A dry material according to claim 10, wherein the effect pigment is a pearl luster pigment of $TiO_2$ and/or $Fe_2O_3$ coated on mica.

13. A dry material according to claim 10, wherein the effect pigment is a pigment of $SiO_2$ flake coated with $TiO_2$ and/or $Fe_2O_3$.

14. A dry material according to claim 10, wherein the styrene-modified polyacrylate is an α-methylstyrene-modified polyacrylate.

15. A paint, varnish, printing ink, plastic, automotive finish or powder coating composition, comprising a dry material according to claim 10.

16. A non-dusting homogeneous pigment composition according to claim 1, wherein at least one effect pigment is a pigment based on a platelet-shaped and transparent or semi-transparent substrate or a metal effect pigment.

17. A non-dusting homogeneous pigment composition according to claim 1, wherein at least one effect pigment is a pigment based on mica or $SiO_2$ flakes.

18. A non-dusting homogeneous pigment composition according to claim 1, wherein the composition comprises 5 to 40% by weight of the styrene-modified polyacrylate having an acid number >90 mg KOH/g.

19. A non-dusting homogeneous pigment composition according to claim 1, wherein the styrene-modified polyacrylate has an acid number >100 mg KOH/g.

* * * * *